(12) United States Patent
Onufryk et al.

(10) Patent No.: US 7,478,186 B1
(45) Date of Patent: Jan. 13, 2009

(54) INTERRUPT COALESCER FOR DMA CHANNEL

(75) Inventors: Peter Z. Onufryk, Flanders, NJ (US); Nelson L. Yue, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 252 days.

(21) Appl. No.: 10/939,536

(22) Filed: Sep. 13, 2004

Related U.S. Application Data (60) Provisional application No. 60/576,881, filed on Jun. 3, 2004.

(51) Int. Cl.
*G06F 13/24* (2006.01)

(52) U.S. Cl. .................... 710/263; 710/264

(58) Field of Classification Search ............. 710/22, 710/23, 25, 27, 28, 34, 48, 308, 260, 262–264, 710/266, 268, 269
See application file for complete search history.

(56) References Cited

U.S. PATENT DOCUMENTS

| | | | | | |
|---|---|---|---|---|---|
| 5,363,506 | A | * | 11/1994 | Fukuoka | 710/267 |
| 5,708,814 | A | * | 1/1998 | Short et al. | 710/260 |
| 5,708,817 | A | * | 1/1998 | Ng et al. | 710/266 |
| 5,797,037 | A | * | 8/1998 | Ecclesine | 710/48 |
| 5,828,856 | A | * | 10/1998 | Bowes et al. | 710/308 |
| 5,943,479 | A | * | 8/1999 | Klein et al. | 709/212 |
| 6,065,089 | A | | 5/2000 | Hickerson et al. | |
| 6,115,776 | A | * | 9/2000 | Reid et al. | 710/260 |
| 6,189,066 | B1 | | 2/2001 | Lowe et al. | |
| 6,192,440 | B1 | * | 2/2001 | Lowe et al. | 710/260 |
| 6,615,305 | B1 | * | 9/2003 | Olesen et al. | 710/262 |
| 6,658,502 | B1 | * | 12/2003 | Story et al. | 710/22 |
| 6,760,799 | B1 | * | 7/2004 | Dunlap et al. | 710/260 |
| 6,766,400 | B2 | * | 7/2004 | Honma et al. | 710/261 |
| 6,988,156 | B2 | * | 1/2006 | Musumeci | 710/260 |
| 7,032,049 | B2 | * | 4/2006 | Barrenscheen | 710/262 |
| 7,054,972 | B2 | * | 5/2006 | Parry et al. | 710/260 |

OTHER PUBLICATIONS

DMA Fundamentals on Various PC Platforms, Harvey et al., National Instruments Corporation, Apr. 1991.*
EP660 DMA Controller, Eureka Technology Inc., 2000.*
Definition of Direct Memory Access from Wikipedia.*
Introduction to Counter/Timer Hardware, Michael Barr's Embedded Systems Glossary, 2002.*

* cited by examiner

*Primary Examiner*—Khanh Dang
(74) *Attorney, Agent, or Firm*—Victor H. Okumoto; Glass & Associates (57) ABSTRACT

A DMA interrupt coalescer processes interrupts received from a DMA channel of a DMA controller by transmitting an interrupt request to an interrupt controller if a coalescing condition is satisfied after receiving one or more delayable interrupts, or transmitting the interrupt request regardless of the satisfaction of the coalescing condition if a non-delayable interrupt is received. The coalescing condition is satisfied if a non-zero period of time has transpired since a first of the one or more delayable interrupts was received, or if a number of the one or more delayable interrupts received exceeds a programmed value.

14 Claims, 5 Drawing Sheets fig.1 fig.2 fig. 3 fig. 4 fig.5 fig.6 fig.7

INTERRUPT COALESCER FOR DMA CHANNEL

CROSS REFERENCE TO RELATED APPLICATIONS

This application claims priority to U.S. provisional application Ser. No. 60/576,881 filed Jun. 3, 2004 and incorporated herein by reference.

FIELD OF THE INVENTION

The present invention generally relates to techniques for coalescing interrupts in a computer system and in particular, to an interrupt coalescer for coalescing interrupts from individual DMA channels in a computer system.

BACKGROUND OF THE INVENTION

A central processing unit (CPU) in a computer system is a valuable resource performing various important tasks. Occasionally, execution of the CPU must be interrupted so that it can service a request from a device before its currently running application is completed. If these interrupt requests become too frequent, however, then performance of the computer system may be degraded. On the other hand, if interrupt requests are not appropriately serviced in a timely fashion, then the requesting devices may be left hanging, which may also result in degraded system performance or even failure in the case of some urgent interrupt requests.

OBJECTS AND SUMMARY OF THE INVENTION

Accordingly, one object of the present invention is to provide a method and apparatus that coalesces delayable interrupts before transmitting an interrupt request to a central processor.

Another object is to provide a method and apparatus that transmits an interrupt request without undue delay to a central processor if an interrupt requesting device needs immediate servicing.

These and other objects are accomplished by the various aspects of the present invention, wherein briefly stated, one aspect is a method for handling interrupts comprising: transmitting an interrupt request if a coalescing condition is satisfied after receiving one or more delayable interrupts; and transmitting the interrupt request regardless of the satisfaction of the coalescing condition if a non-delayable interrupt is received.

Another aspect is an apparatus for handling interrupts comprising: an event counter incrementing an event count each time a delayable interrupt is received; a timer counter incrementing a timer count in response to a clock source; and logic configured to transmit an interrupt request if a coalescing condition is satisfied after receiving one or more delayable interrupts, and transmit the interrupt request regardless of the satisfaction of the coalescing condition if a non-delayable interrupt is received.

Another aspect is a method for coalescing interrupts comprising: receiving one or more delayable interrupts; and transmitting an interrupt request if a non-zero period of time has transpired since a first of the one or more delayable interrupts was received or a number of the one or more delayable interrupts received exceeds a programmed value.

Another aspect is an apparatus for coalescing interrupts comprising: an event counter incrementing an event count each time a delayable interrupt is received; a timer counter incrementing a timer count in response to a clock source; and logic configured to receive delayable interrupts, and transmit an interrupt request if the timer count indicates that a non-zero period of time has transpired since a first of the delayable interrupts was received or the event count indicates that a number of the delayable interrupts received exceeds a programmed value.

Another aspect is a DMA interrupt coalescer for coalescing delayable interrupts from a multi-channel DMA controller, comprising a plurality of interrupt coalescing units coupled to corresponding channels of the DMA controller wherein individual of the plurality of interrupt coalescing units include logic configured to transmit an interrupt request if a coalescing condition is satisfied after receiving one or more delayable interrupts or transmit the interrupt request regardless of the satisfaction of the coalescing condition if a non-delayable interrupt is received.

Still another aspect is a DMA interrupt coalescer for coalescing delayable interrupts from a multi-channel DMA controller, comprising a plurality of interrupt coalescing units coupled to corresponding channels of the DMA controller wherein individual of the plurality of interrupt coalescing units include logic configured to receive the delayable interrupts and transmit an interrupt request if a non-zero time has transpired since a first of the delayable interrupt requests was received or a number of the delayable interrupts received exceeds a programmed value.

Yet another aspect is a computer system comprising: a memory; a plurality of interfaces; a DMA controller for controlling DMA transfers between the memory and the plurality of interfaces; a processor; an interrupt controller for transmitting interrupt requests to the processor; and a DMA interrupt coalescer functioning between the DMA controller and the interrupt controller for coalescing delayable interrupts from the DMA controller to the interrupt controller.

Additional objects, features and advantages of the various aspects of the present invention will become apparent from the following description of its preferred embodiment, which description should be taken in conjunction with the accompanying drawings.

DETAILED DESCRIPTION OF THE PREFERRED EMBODIMENT

Figure 1:
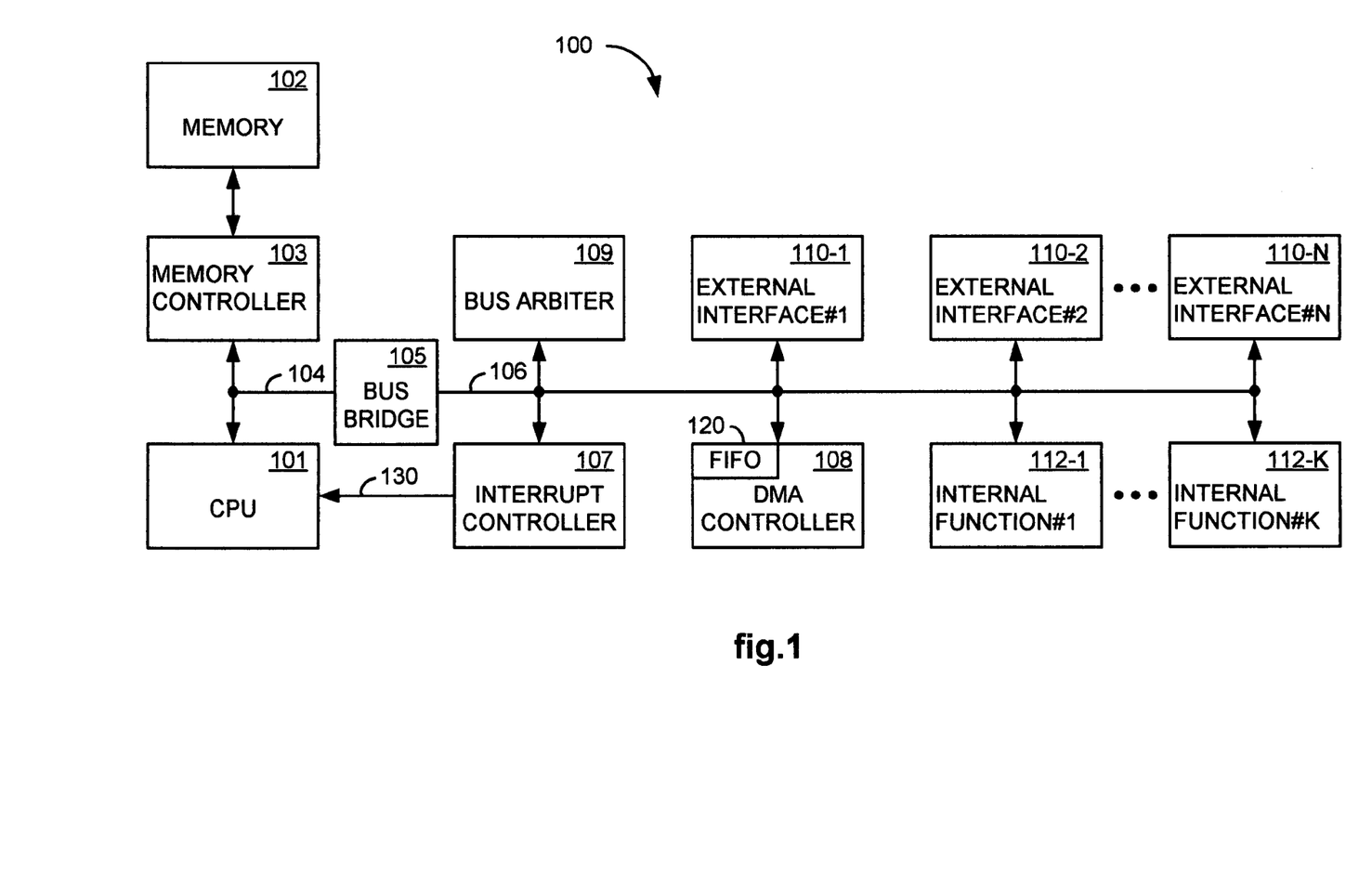
FIG. 1 illustrates a block diagram of a computer system utilizing aspects of the present invention.

FIG. 1 illustrates, as an example, a block diagram of a computer system 100. In the computer system 100, a system memory 102 is coupled to a CPU 101 through a memory controller 103 and a CPU bus 104. A bus bridge 105 bridges communications between the CPU bus 104 and a local bus 106. An interrupt controller 107 communicates interrupt requests to the CPU 101 from interrupt requesting components coupled to the local bus 106. A direct memory access (DMA) controller 108 manages DMA transfers between the system memory 102 and memory accessing components coupled to the local bus 106. A bus arbiter 109 arbitrates and grants requests to access the local bus 106.

A number of interfaces are provided for communicating with devices that are external of the computer system 100, such as external interfaces 110-1 to 110-N which are coupled to the local bus 106. Examples of such external interfaces include a peripheral component interface (PCI) controller, one or more Ethernet interfaces, a serial peripheral interface (SPI), a general purpose input/output (GPIO) interface, an asynchronous transfer mode (ATM) interface, and a universal asynchronous receiver/transmitter (UART).

In addition, a number of components are also provided for performing various functions in the computer system 100, such as internal functions 112-1 to 112-K which are coupled to the local bus 106. One such internal function is a DMA interrupt coalescer, which will be described in more detail below. Examples of other internal functions include system integrity functions, counter timers, a security engine, and a random number generator.

Figure 2:
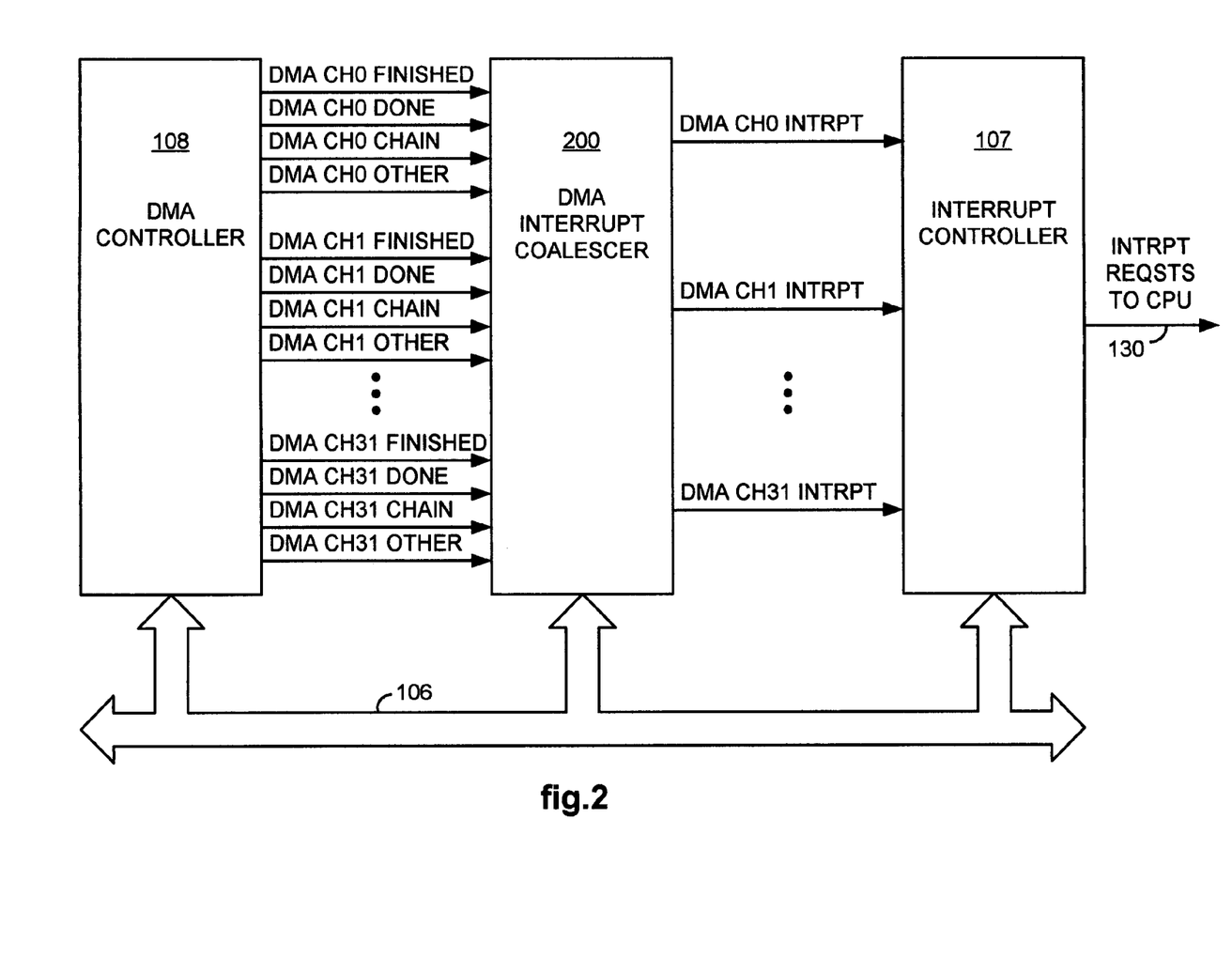
FIG. 2 illustrates a block diagram of a portion of the computer system including a DMA interrupt coalescer utilizing aspects of the present invention.

FIG. 2 illustrates, as an example, a block diagram of a portion of the computer system 100 including the DMA controller 108, the interrupt controller 107, and a DMA interrupt coalescer 200 which functionally operates between the DMA controller 108 and the interrupt controller 107. Although shown as a separate block in this example, it is to be appreciated that the DMA interrupt coalescer 200 may also be integrated, in whole or in part, into the DMA controller 108 and/or the interrupt controller 107.

The DMA controller 108 includes, for example, 32 independent DMA channels, all of which operate in substantially the same manner. Table I illustrates DMA channel assignments for the DMA Controller 108. Channels 0-4 are assigned to servicing two Ethernet interfaces. Channels 5-6 are assigned to servicing a FIFO holding memory 120 in the DMA controller 108. Channel 7 is assigned to servicing a PCI interface. Channels 8-9 are assigned to service a security engine function. Channel 10 is assigned to service a random number generator function. Channels 11-31 are assigned to servicing various ATM communications with the system memory 102.

In this example, all DMA operations are performed by reading DMA descriptors from the system memory 102. A DMA is descriptor is read from memory to determine control information when a DMA descriptor operation begins, and is written back to memory with updated status information when a DMA descriptor operation completes.

The DMA descriptor includes a number of fields and bits such as a COUNT field indicating the number of bytes to transfer; a device command field (DEVCMD) for passing device specific control information to a peripheral at the start of a DMA descriptor operation, and record peripheral status information at the end of the DMA descriptor operation; and a device select (DS) field for indicating the peripheral device to be used during the DMA descriptor operation.

Also included in the DMA descriptor are a number of interrupt related bits such as a finished (F) bit indicating when set that DMA descriptor processing has ceased due to a finished event (e.g., the number of bytes specified in the COUNT field have been transferred); a done (D) bit indicating when set that DMA descriptor processing has ceased due to a done event (e.g., the device indicated in the DS field has indicated that it is done); an interrupt on done (IOD) bit indicating that a DONE interrupt is to be generated upon occurrence of a done event; and an interrupt on finished (IOF) bit indicating that a FINISHED interrupt is to be generated upon occurrence of a finished event.

Further included in the DMA descriptor are DMA descriptor chaining related bits such as a chain on done (COD) bit indicating when set that the DMA controller 108 is to load a next DMA descriptor in a linked list of DMA descriptors after processing for a current DMA descriptor ceases due to a done event, and a chain on finished (COF) bit indicating when set that the DMA controller 108 is to load a next DMA descriptor in a linked list of DMA descriptors after processing for a current DMA descriptor ceases due to a finished event.

Other items included in the DMA descriptor are a terminated (T) bit indicating when set that DMA descriptor processing has been abnormally terminated; a current address (CA) field which is initialized with the DMA starting address at the start of a DMA operation and is updated when descriptor processing is completed; and a link (LINK) field pointing to a next DMA descriptor to be processed in a linked list of DMA descriptors.

The DMA interrupt coalescer 200 includes, for example, 32 interrupt coalescing units individually servicing a corresponding channel of the DMA controller 108. Each interrupt coalescing unit, such as the one depicted in FIG. 3 for the first DMA channel, may receive a number of interrupts from its respective DMA channel, such as a FINISHED, DONE, CHAIN, or OTHER interrupt.

TABLE I

| DMA Channel | Device Description |
| --- | --- |
| Channel 0 | Ethernet 0 Receive |
| Channel 1 | Ethernet 0 Transmit |
| Channel 2 | Ethernet 1 Receive |
| Channel 3 | Ethernet 1 Transmit |
| Channel 4 | Memory to Memory (Memory to Holding FIFO) |
| Channel 5 | Memory to Memory (Holding FIFO to Memory) |
| Channel 6 | PCI (PCI to Memory) |
| Channel 7 | PCI (Memory to PCI) |
| Channel 8 | Security Engine Input |
| Channel 9 | Security Engine Output |
| Channel 10 | Random Number Generator |
| Channels 11-31 | ATM |

The FINISH interrupt indicates that the DMA controller 108 has finished its current processing task due to a finished event such as completion of a DMA transfer. The DONE interrupt indicates that the DMA controller 108 has finished its current processing task due to a done event such as the device to from which a data transfer is being conducted generates a done indication. The CHAIN interrupt indicates that a DMA descriptor chaining operation is taking place wherein a number of DMA descriptors are linked together through a linked list. Each of these interrupts is referred to as being a delayable interrupt, because immediate servicing of these interrupts is not required. Therefore, the interrupt coalescer 200 does not transmit an interrupt request to the interrupt controller 107 for any of these interrupts until a coalescing condition is satisfied.

Examples of the OTHER interrupt include an error interrupt which indicates that an error has occurred during the current DMA transfer, and a halt interrupt which indicates that the current DMA transfer has been halted for some reason. These interrupts are referred to as being non-delayable interrupts, because immediate servicing of these interrupts is required. Therefore, the interrupt coalescer 200 should transmit an interrupt request to the interrupt controller 107 for any of these interrupts without regard to any coalescing conditions.

Although being depicted as being provided on separate lines in FIG. 2, preferably the interrupts FINISHED, DONE, CHAIN and OTHER are provided on a single line or flag to their corresponding interrupt coalescing unit by OR'ing them together. The particular type of interrupt that caused activation of the line or setting of the flag can then be determined by reading a status register (and a masking register if such a register is used) corresponding to the DMA channel in the DMA controller 108.

Figure 3:
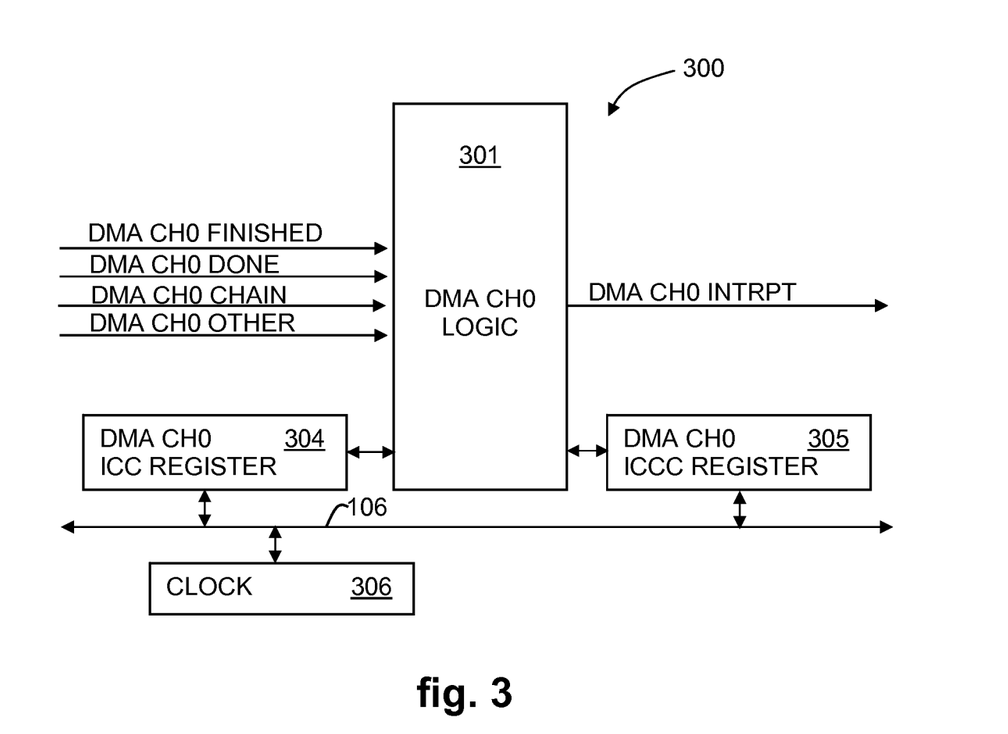
FIG. 3 illustrates a block diagram of a portion of the DMA interrupt coalescer servicing a first DMA channel, utilizing aspects of the present invention.

FIG. 3 illustrates, as an example, a block diagram of an interrupt coalescing unit 300 of the DMA interrupt coalescer 200. In this example, the interrupt coalescing unit 300 is servicing the first DMA channel (DMA CH0) of the DMA controller 108. Other channels (DMA CH1~CH31) of the DMA controller 108 have similar interrupt coalescing units servicing them. Included in the interrupt coalescing unit 300 are logic 301, an interrupt coalescer control (ICC) register 304, and an interrupt coalescing clock control (ICCC) register 305.

The logic 301 receives interrupts (e.g., FINISHED, DONE, CHAIN, and OTHER) from the DMA controller 108, and transmits an interrupt request (INTRPT) to the interrupt controller 107 for its corresponding DMA channel (DMA CH0) if either a coalescing condition is satisfied after receiving one or more delayable interrupts, or a non-delayable interrupt is received.

One example of a coalescing condition being satisfied is the condition that a non-zero period of time must transpire since a first of the one or more delayable interrupts was received. An interrupt in this case is referred to as being "the first delayable interrupt" if it is the first delayable interrupt received since either system startup or the last transmission of an interrupt request by the logic 301. Another example of a coalescing condition being satisfied is the condition that a number of the one or more delayable interrupts received must exceed a programmed value.

Designation of delayable interrupts is provided in the ICC register 304 as one-bit fields F, D and C, which respectively correspond to the FINISHED, DONE and CHAIN interrupts. These interrupts are coalesced by the logic 301 if their respective bit values are a "1", and they are not coalesced (i.e., treated as non-delayable interrupts) if their respective bit values are a "0". Interrupts that are not represented by one-bit fields in the ICC register 304 are treated as non-delayable interrupts, such as the OTHER interrupt shown in FIG. 3.

Figure 4:
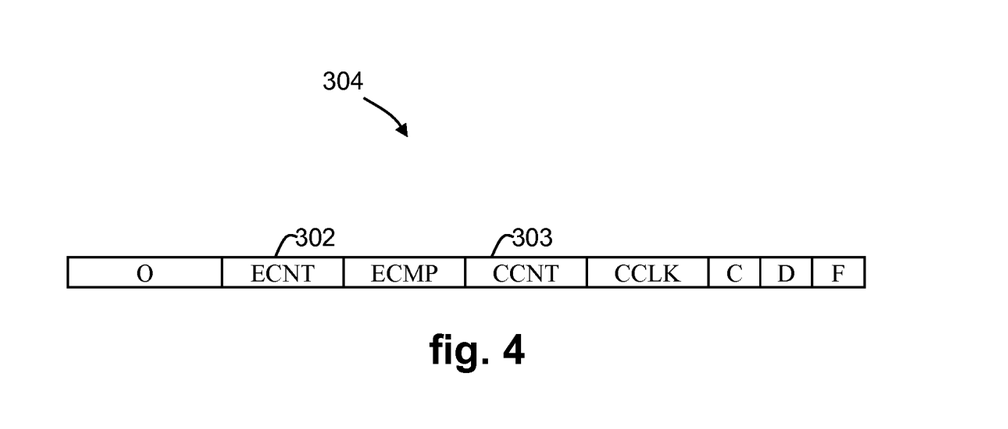
FIG. 4 illustrates the fields of an interrupt coalescer control (ICC) register for the first DMA channel, utilizing aspects of the present invention.
Figure 7:
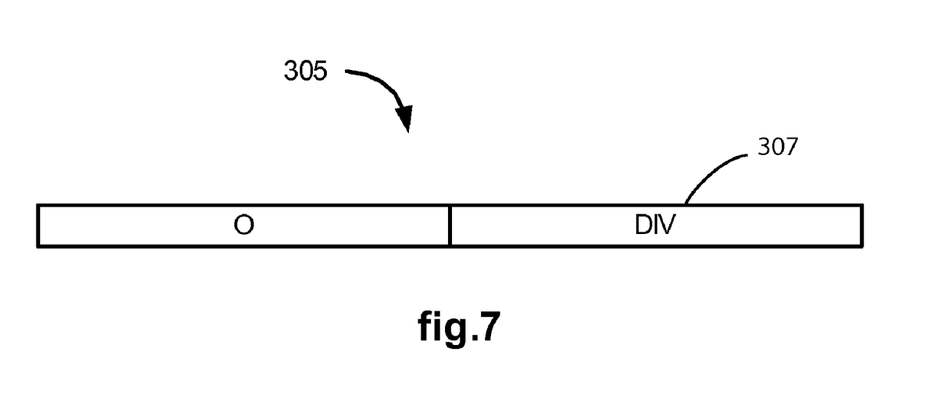
FIG. 7 illustrates the fields of an interrupt coalescing clock control (ICCC) register for the first DMA channel, utilizing aspects of the present invention.

An example of the ICC register 304 is illustrated in FIG. 4, and an example of the ICCC register 305 is illustrated in FIG. 7. Contents of both registers are programmable (i.e., write as well as read accessible) through the local bus 106. In addition to the one-bit delayable interrupt fields C, D and F, the ICC register 304 also includes a field for an event counter (ECNT) 302 and a timer counter (CCNT) 303 which are used for coalescing delayable interrupts. These and other contents of the ICC register 304 and the ICCC register 305 will be described in further detail as appropriate in the following description.

Figure 5:
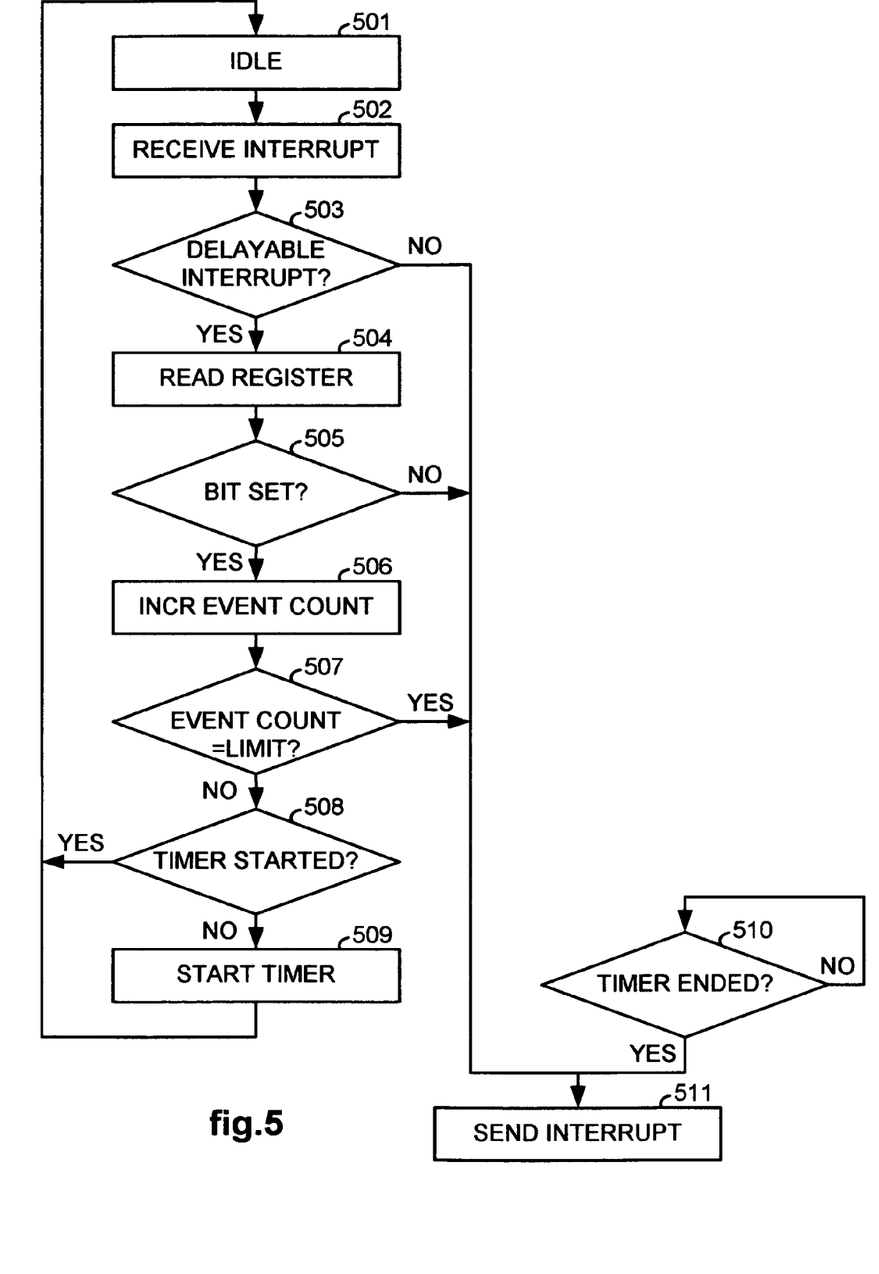
FIG. 5 illustrates a flow diagram of a method for coalescing interrupts for a DMA channel, utilizing aspects of the present invention.

FIG. 5 illustrates a flow diagram of a method for coalescing interrupts for a DMA channel that is preferably performed by an interrupt coalescing unit such as the interrupt coalescing unit 300 illustrated in FIG. 3. In 501, the method is in an idle state and the event counter (ECNT) 302 in the ICC register 304 has been initialized to a count of zero at system startup or after a last transmission of an interrupt request for the DMA channel.

In 502, an interrupt is received, for example from the DMA controller 108, and in 503 it is determined whether or not the interrupt is a delayable interrupt. In the preferred embodiment, in order to be a delayable interrupt, the type of interrupt (e.g., FINISH, DONE, CHAIN or OTHER) must have a one-bit field associated with it in the ICC register 304. Otherwise, the interrupt is determined to be a non-delayable interrupt in 503, and the method proceeds to 511 so that the interrupt request will be transmitted without a coalescing delay.

Since the ICC register 304 has one-bit fields defined for a FINISH (F field), DONE (D field), and CHAIN (C field), these interrupts will be considered delayable interrupts for the purposes of 503, and if any one of these types of interrupts is received, then the method proceeds to 504. On the other hand, since the ICC register 304 does not have an one-bit field defined for an OTHER interrupt, these interrupts will be considered non-delayable interrupts for the purposes of 503, and if any one of these types of interrupts is received, then the method proceeds to 511.

In 504, the value of the one-bit field corresponding to a received delayable interrupt in 502 is read from the ICC register 304. In 505, if the bit is set (i.e., it has been programmed to have a value of "1"), then the delayable interrupt is to be coalesced and the method proceeds with 506. On the other hand, if the bit is not set (i.e., it's value is "0"), then the delayable interrupt is not be coalesced and the method proceeds to 511 to transmit an interrupt request to the interrupt controller 107 without a coalescing delay.

In 506, the event counter (ECNT) 302 is incremented by one to indicate receipt of a delayable interrupt. In 507, the count in the event counter (ECNT) 302 of the ICC register 304 is compared with a programmed value (ECMP) which is also provided in the ICC register 304. If the count of the event counter (ECNT) 302 equals the programmed value (ECMP), then the method proceeds to 511 to transmit an interrupt request to the interrupt controller 107. On the other hand, if the count of the event counter 302 is less than the programmed value (ECMP), then the method proceeds to 508.

In 508, the method determines whether or not the timer counter (CCNT) 303 in the ICC register 304 has been started. The preferred way to do this is to check the count of the event counter (ECNT) 302 in the ICC register 304. If the count is one, then the timer counter (CCNT) 303 should be started and the method proceeds to 509. On the other hand, if the count (ECNT) is greater than one, then the timer counter (CCNT) 303 is assumed to have already been started, and the method proceeds back to 501 to wait for either the receipt of another interrupt in 502 or the saturation of the timer counter (CCNT) 303 in 510.

Figure 6:
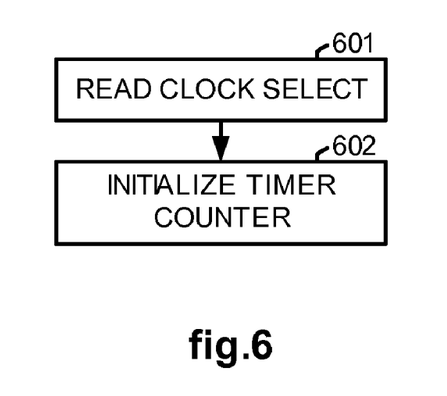
FIG. 6 illustrates a flow diagram of a method for initializing a timer counter in the DMA interrupt coalescer, utilizing aspects of the present invention.

The operation of 509 is further detailed in FIG. 6, which illustrates, as an example, a flow diagram of a method for initializing the timer counter (CCNT) 303 in the DMA interrupt coalescer 200. In 601, the logic 301 reads a coalescing clock select (CCLK) field of the ICC register 304, which indicates the clock source to be used for incrementing the timer counter (CCNT) 303.

As an example, four coalescing clocks are generated by the DMA interrupt coalescer 200, any one of which may be selected as the time base for delaying DMA interrupts. Each of the coalescing clock sources has a corresponding register such as the ICCC register 305 illustrated in FIG. 7. The coalescing clock source is then generated by dividing the clock 306 of the local bus 106 by the value indicated in the clock divisor (DIV) field 307 in the ICCC register 305.

In 602, the logic 301 initializes the timer counter (CCNT) 303 by setting its value to zero in the ICC register 304, so that it is effectively reset upon the logic 301 receiving a first delayable interrupt since its last transmission of an interrupt request to the interrupt controller 107 or system startup. The timer counter 303 is then incremented with each rising edge of the coalescer clock source until it saturates at its maximum value of 0x1F. When this occurs, the decision block 510 results in a YES determination, and the method proceeds to 511.

In 511, an interrupt request (INTRPT) is transmitted by the logic 301 to the interrupt controller 107 for the DMA channel. The type of interrupt(s) causing the interrupt request (IN-TRPT) may be ascertained by the interrupt controller 107 or the CPU 101 by reading a status register corresponding to the DMA channel in the DMA controller 108. Also at this time, the event counter (ECNT) 302 is reset to a count of zero. The timer counter (CCNT) 303 may also be reset at this time with its coalescing clock source disconnected so as not to increment its count until the timer counter (CCNT) 303 is restarted in 509.

Thus, 501~511 describes a method in which the interrupt coalescer 200 transmits an interrupt request (INTRPT) for a DMA channel to the interrupt controller 107 after a coalescing condition is satisfied after receiving one or more delayable interrupts, and/or transmits the interrupt request to the interrupt controller 107 without a coalescing delay if after receiving a non-delayable interrupt. By handling interrupts in this manner, urgent interrupts will be handled immediately without undue delay, and less than urgent interrupts will be coalesced so as not to overly burden the CPU 101 with the handling of such interrupts.

Note that it is possible to set the interrupt coalescing unit 300 to a coalescing delay window only mode by setting the programmed value (ECMP) to zero, since by doing so, the count of the event counter (ECNT) will never be equal to that value when the two are compared in 507. Conversely, it is possible to set the interrupt coalescing unit 300 to an event counting only mode by setting the coalescing clock select (CCLK) field to a predefined clock disabled value. Also note, however, that if the programmed value (ECMP) is set to zero and the coalescing clock select (CCLK) field is set to the predefined clock disabled value due to a configuration error, then all delayable interrupts will be permanently delayed.

Although the various aspects of the present invention have been described with respect to a preferred embodiment, it will be understood that the invention is entitled to full protection within the full scope of the appended claims.

We claim:

1. A method for handling interrupts between a direct memory access (DMA) controller and an interrupt controller, the method comprising the steps of:
   receiving at least one DMA interrupt from a DMA controller at an interrupt coalescing unit;
   designating the at least one DMA interrupt received at the interrupt coalescing unit as either a delayable interrupt or a non-delayable interrupt; and
   if the at least one DMA interrupt received is a delayable interrupt, coalescing the at least one delayable interrupt at the interrupt coalescing unit, incrementing an event counter and starting a timer counter;
   determining if a coalescing condition has been satisfied and if the coalescing condition has been satisfied, transmitting an interrupt request from the interrupt coalescing unit to the interrupt controller, resetting the event counter to zero and resetting the timer counter to zero, wherein the coalescing condition is satisfied if the timer counter indicates that a programmable period of time has transpired since a first of the one or more delayable interrupts was received or a count of the event counter has exceeded a programmed value;
   or, if the at least one DMA interrupt received is a non-delayable interrupt, transmitting the interrupt request from the interrupt coalescing unit to the interrupt controller regardless of the satisfaction of the coalescing condition.

2. The method according to claim 1, wherein the programmable period of time is determined by a programmable value that indicates a clock source.

3. The method according to claim 1, further comprising:
   reading an indication of a clock source;
   incrementing the timer counter upon each period of the indicated clock source until the timer counter saturates at a maximum count.

4. The method according to claim 3, wherein the indicated clock source is a coalescing clock source that is generated by dividing a clock of the local bus by a clock divisor that is stored in a programmable register.

5. An apparatus for handling interrupts between a direct memory access (DMA) controller and an interrupt controller, comprising:
   logic configured to designate a DMA interrupt received from a DMA controller as either a delayable DMA interrupt or a non-delayable DMA interrupt and if the at least one DMA interrupt received is a delayable interrupt, to coalese the at least one delayable interrupt at the interrupt coalescing unit, to increment an event counter and to start a timer counter, the logic further configured to determine if a coalescing condition has been satisfied and if the coalescing condition has been satisfied, to transmit an interrupt request from the interrupt coalescing unit to the interrupt controller, to reset the event counter to zero and reset the timer counter to zero, wherein the coalescing condition is satisfied if the timer counter indicates that a programmable period of time has transpired since a first of the one or more delayable interrupts was received or a count of the event counter has exceeded a programmed value, or, if the at least one DMA interrupt received is a non-delayable interrupt, to transmit the interrupt request from the interrupt coalescing unit to the interrupt controller regardless of the satisfaction of the coalescing condition.

6. The apparatus according to claim 5, wherein a timer count of the timer counter is incremented in response to a clock source, and wherein the clock source comprises a coalescing clock source, wherein the logic generates the coalescing clock source by dividing a clock of the local bus by a clock divisor.

7. A DMA interrupt coalescer for coalescing interrupts from a multi-channel DMA controller, comprising a plurality of interrupt coalescing units coupled to corresponding channels of the DMA controller wherein individual of the plurality of interrupt coalescing units include:
   logic configured to designate a DMA interrupt received from a DMA controller as either a delayable DMA interrupt or a non-delayable DMA interrupt and if the at least one DMA interrupt received is a delayable interrupt, to coalese the at least one delayable interrupt at the interrupt coalescing unit, to increment an event counter and to start a timer counter, the logic further configured to determine if a coalescing condition has been satisfied and if the coalescing condition has been satisfied, to transmit an interrupt request from the interrupt coalescing unit to the interrupt controller, to reset the event counter to zero and reset the timer counter to zero, wherein the coalescing condition is satisfied if the timer counter indicates that a programmable period of time has transpired since a first of the one or more delayable interrupts was received or a count of the event counter has exceeded a programmed value, or, if the at least one DMA interrupt received is a non-delayable interrupt, to transmit the interrupt request from the interrupt coalescing unit to the interrupt controller regardless of the satisfaction of the coalescing condition;

the event counter coupled to the logic, the event counter configured to increment an event count each time a received DMA interrupt is coalesced, configured to compare the event count to a first programmable value in the first programmable register to determine whether the coalescing condition is satisfied and configured to reset the event counter after transmitting to the DMA controller received DMA interrupts that have been coalesced when the coalescing condition has been satisfied; and the timer counter coupled to the logic, the logic configured to increment a timer count in response to a clock source, configured to initiate the timer counter when a first received DMA interrupt is coalesced, the logic configured to use the timer count to determine whether the coalescing condition is satisfied and configured to reset the timer counter after transmitting to the DMA controller received DMA interrupts that have been coalesced when a coalescing condition has been satisfied.

8. The DMA interrupt coalescer according to claim 7, wherein the clock source is designated by a second programmable value in the first programmable register and wherein the coalescing condition is satisfied when the timer counter has saturated at a maximum count.

9. The DMA interrupt coalescer according to claim 8, wherein the clock source comprises a coalescing clock source, wherein the logic generates the coalescing clock source by dividing a clock of the local bus by a clock divisor that is stored in a second programmable register.

10. A computer system comprising:
a memory;
a plurality of interfaces;
a DMA controller electrically coupled to the memory and the plurality of interfaces for controlling DMA transfers between the memory and the plurality of interfaces;
a processor;
an interrupt controller electrically coupled to the processor for transmitting interrupt requests to the processor; and
a DMA interrupt coalescer electrically coupled to the DMA controller and to the interrupt controller for coalescing interrupts from the DMA controller to the interrupt controller, wherein the DMA interrupt coalescer includes a plurality of interrupt coalescing units coupled to corresponding channels of the DMA controller wherein individual of the plurality of interrupt coalescing units include:

logic configured to designate a DMA interrupt received from a DMA controller as either a delayable DMA interrupt or a non-delayable DMA interrupt and if the at least one DMA interrupt received is a delayable interrupt, to coalese the at least one delayable interrupt at the interrupt coalescing unit, to increment an event counter and to start a timer counter, the logic further configured to determine if a coalescing condition has been satisfied and if the coalescing condition has been satisfied, to transmit an interrupt request from the interrupt coalescing unit to the interrupt controller, to reset the event counter to zero and reset the timer counter to zero, wherein the coalescing condition is satisfied if the timer counter indicates that a programmable period of time has transpired since a first of the one or more delayable interrupts was received or a count of the event counter has exceeded a programmed value, or, if the at least one DMA interrupt received is a non-delayable interrupt, to transmit the interrupt request from the interrupt coalescing unit to the interrupt controller regardless of the satisfaction of the coalescing condition.

11. The computer system according to claim 10, wherein each of the individual coalescing units further includes:
an event counter coupled to the logic, the logic configured to increment an event count each time a received DMA interrupt is coalesced, configured to compare the event count to a first programmable value in the first programmable register to determine whether the coalescing condition is satisfied and configured to reset the event counter after transmitting to the DMA controller received DMA interrupts that have been coalesced when a coalescing condition has been satisfied; and
a timer counter coupled to the logic, the logic configured to increment a timer count in response to a clock source, configured to initiate the timer counter when a first received DMA interrupt is coalesced, the logic configured to use the timer count to determine whether the coalescing condition is satisfied and configured to reset the timer counter after transmitting to the DMA controller received DMA interrupts that have been coalesced when a coalescing condition has been satisfied.

12. The computer system according to claim 11, wherein the clock source is designated by a second programmable value in the first programmable register.

13. The computer system according to claim 12, wherein the coalescing condition is satisfied when the timer counter has saturated at a maximum count.

14. The computer system according to claim 13, wherein the clock source comprises a coalescing clock source, wherein the logic generates the coalescing clock source by dividing a clock of the local bus by a clock divisor that is stored in a second programmable register.

* * * * *